(12) United States Patent
Goud et al.

(10) Patent No.: US 7,653,808 B2
(45) Date of Patent: Jan. 26, 2010

(54) PROVIDING SELECTABLE PROCESSOR ABSTRACTION LAYER COMPONENTS WITHIN ONE BIOS PROGRAM

(75) Inventors: Gundrala D. Goud, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 10/306,065

(22) Filed: Nov. 27, 2002

(65) Prior Publication Data

US 2004/0103273 A1 May 27, 2004

(51) Int. Cl.
*G06F 15/177* (2006.01)

(52) U.S. Cl. .................. 713/1; 713/2; 713/100

(58) Field of Classification Search ............ 713/1, 713/2, 100; 714/10, 11, 15, 2, 3, 5, 100; 717/151, 173, 168, 169, 170, 1; 711/152, 711/153, 154, 162, 1
See application file for complete search history.

(56) References Cited

U.S. PATENT DOCUMENTS

| | | | | | |
|---|---|---|---|---|---|
| 5,826,090 | A | * | 10/1998 | Mealey et al. | 717/162 |
| 5,835,775 | A | * | 11/1998 | Washington et al. | 717/153 |
| 5,836,013 | A | * | 11/1998 | Greene et al. | 713/2 |
| 5,933,652 | A | * | 8/1999 | Chen et al. | 710/1 |
| 6,003,130 | A | * | 12/1999 | Anderson | 713/2 |
| 6,081,890 | A | * | 6/2000 | Datta | 713/1 |
| 6,161,177 | A | * | 12/2000 | Anderson | 713/2 |
| 6,263,378 | B1 | * | 7/2001 | Rudoff et al. | 719/327 |
| 6,275,893 | B1 | * | 8/2001 | Bonola | 710/262 |
| 6,381,693 | B2 | * | 4/2002 | Fish et al. | 713/1 |
| 6,425,079 | B1 | * | 7/2002 | Mahmoud | 713/2 |
| 6,446,139 | B1 | * | 9/2002 | Leung et al. | 710/1 |
| 6,446,203 | B1 | * | 9/2002 | Aguilar et al. | 713/2 |
| 6,622,260 | B1 | * | 9/2003 | Marisetty et al. | 714/10 |
| 6,725,178 | B2 | * | 4/2004 | Cheston et al. | 702/186 |
| 6,754,828 | B1 | * | 6/2004 | Marisetty et al. | 726/2 |
| 6,763,327 | B1 | * | 7/2004 | Songer et al. | 703/21 |
| 6,892,323 | B2 | * | 5/2005 | Lin | 714/36 |
| 2003/0135350 | A1 | * | 7/2003 | Cheston et al. | 702/186 |
| 2003/0202602 | A1 | * | 10/2003 | Apostolopoulos et al. | 375/240.24 |
| 2004/0049669 | A1 | * | 3/2004 | Schelling et al. | 713/2 |
| 2004/0123092 | A1 | * | 6/2004 | Cepulis et al. | 713/2 |
| 2004/0208549 | A1 | * | 10/2004 | Rutledge et al. | 398/50 |

* cited by examiner

*Primary Examiner*—Nitin C Patel
(74) *Attorney, Agent, or Firm*—Trop, Pruner & Hu, P.C..

(57) ABSTRACT

A system abstraction layer enables selection from among at least two different processor abstraction layer components. By allowing the selection from a plurality of compressed components, better system adaptability may be achieved. For example, updates may be provided so that it is not necessary to update the entire basic input/output system each time a component of the processor abstraction layer needs to be updated. In addition, a variety of different platforms may be supported by one basic input/output system having a plurality of selectable processor abstraction layer component images.

9 Claims, 3 Drawing Sheets

PROVIDING SELECTABLE PROCESSOR ABSTRACTION LAYER COMPONENTS WITHIN ONE BIOS PROGRAM

BACKGROUND

This invention relates generally to initializing processor-based systems.

Before the operating system is called, the basic input/output system (BIOS) is responsible for initializing and booting the processor-based system. Once the BIOS has completed its tasks, it transfers control to the operating system.

The BIOS may include at least three different levels. The lowest level may be the processor abstraction layer (PAL) that communicates with the hardware and, particularly, the processor. A middle layer is called the system abstraction layer (SAL). The SAL may attempt to correct correctable errors after they are detected and reported by the PAL. The uppermost layer, called the extensible firmware interface (EFI), communicates with the operating system and, in fact, launches the operating system.

In some processor-based systems, more than one PAL component may be provided. For example, in one implementation, two processor-specific components, which may be denominated PAL_A_SPECIFIC and PAL-B, may be provided. These two processor-specific components may typically be stored in system flash and may have a functionality akin to that normally handled by microcode. A third component called PAL_A_GENERIC is processor-independent and is the first component to execute in response to a restart event in some architectures.

The PAL_A_GENERIC component searches a firmware interface table (FIT) to locate a suitable onboard processor compatible with PAL_A_SPECIFIC and authenticates the component. The FIT, also stored in system flash, contains starting addresses and sizes for firmware components outside the protected boot block. The PAL_A_SPECIFIC authenticates the PAL-B component. The PAL_A_SPECIFIC then discovers the PAL-B through a FIT constructed by the original equipment manufacturer detailing, where in the system flash, PAL-B can be found.

After authentication, the PAL_A_SPECIFIC passes control to the original equipment manufacturer provided SAL-A component code. The control flow at this point can be recovery in the case of failed signature verification of the PAL-B or in the case of an incompatible PAL-B with respect to a particular processor stepping.

Only a single PAL-B component is supported because of flash memory space constraints. When it is desired to update the PAL-B in system flash with a newer version of PAL-B, the customer may use a so-called crisis recovery flow. The crisis recovery flow entails user intervention including flipping jumper switches and inserting a disk.

Thus, there is a need for a way that enables updating of PAL components without the need for user intervention.

DETAILED DESCRIPTION

Figure 1:
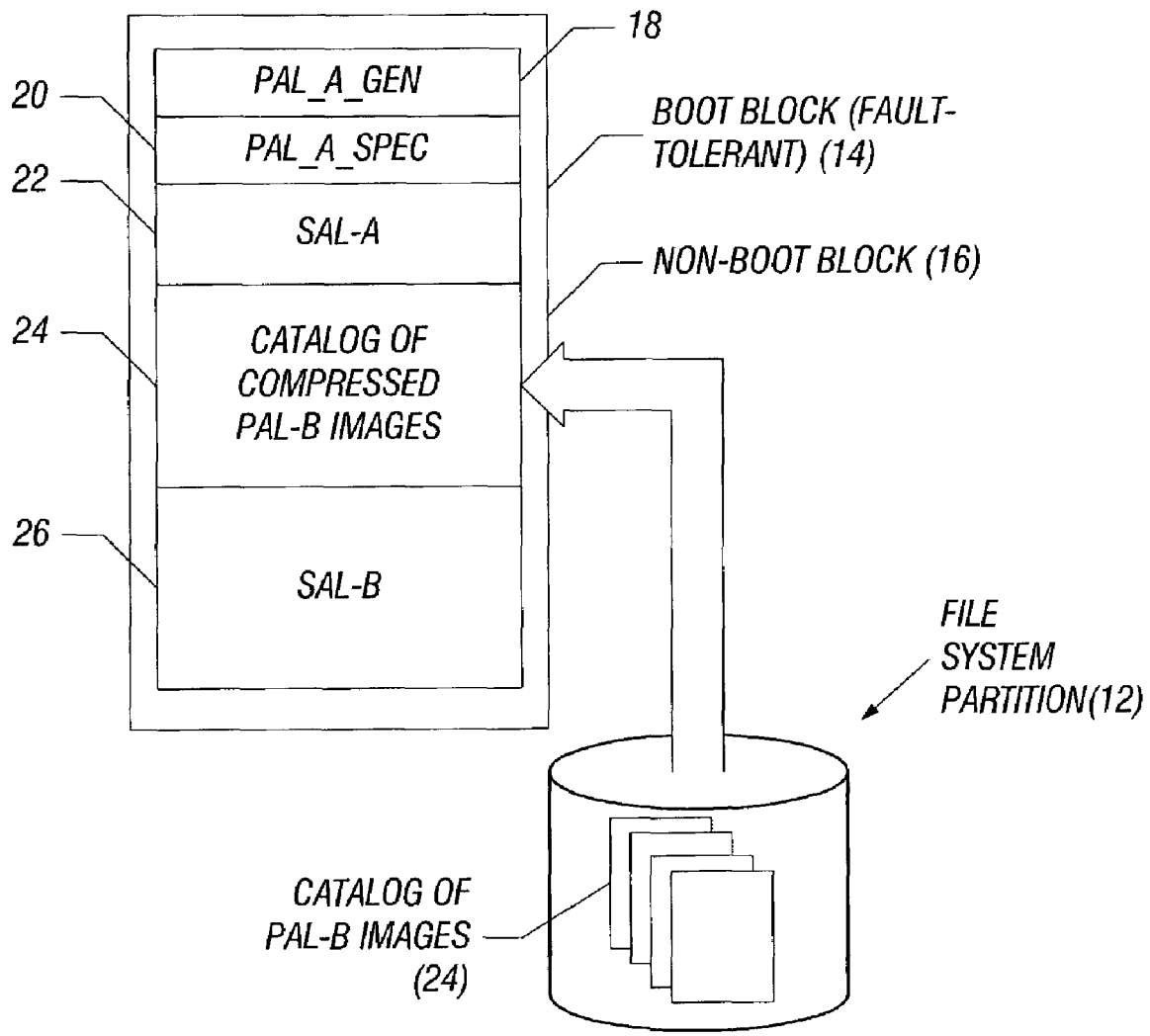
FIG. 1 is a schematic depiction of the BIOS in accordance with one embodiment of the present invention.

Referring to FIG. 1, the basic input/output system (BIOS) may include a PAL_A_GENERIC 18, a PAL_A_SPECIFIC 20, a system abstraction layer-A (SAL-A) 22, a system abstraction layer-B (SAL-B) 26, and a catalog of compressed processor abstraction layer-B (PAL-B) images 24 in one embodiment. Thus, the overall BIOS may be broken into a boot block 14 that is fault tolerant and a non-boot block 16. A catalog 24 of compressed PAL-B images may be stored in a file partition 12 in one embodiment. In one embodiment, the file system partition 12 may be an extensible firmware interface (EFI) partition. In another embodiment the catalog 24 may be stored in a flash-based directory. Other storage access arrangements may also be used including network or other extensible storage channels.

Figure 2:
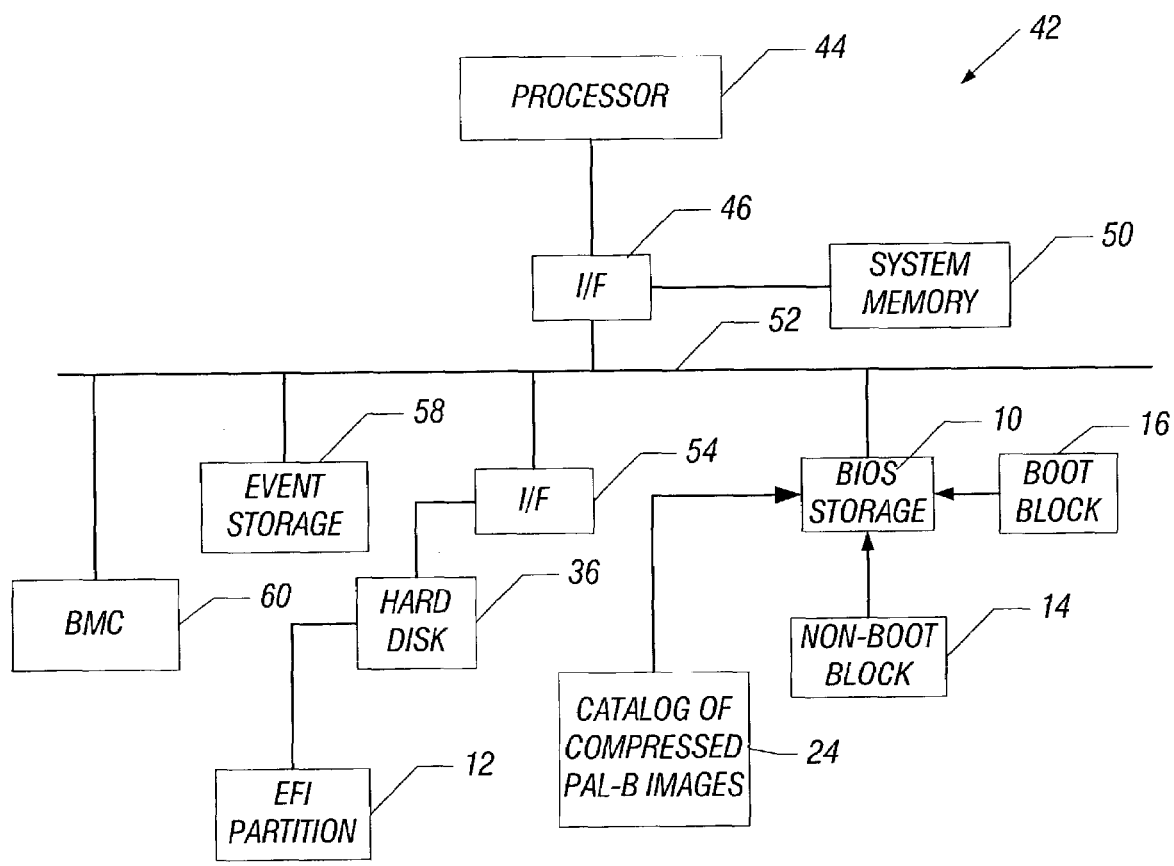
FIG. 2 is a schematic depiction of a system in accordance with one embodiment of the present invention.

Referring to FIG. 2, a platform 42 may be any processor-based system including a server, desktop computer, a laptop computer, a portable computer, or a hand held device, to mention a few examples. The platform 42 may include a processor 44 coupled to an interface or bridge 46. The bridge 46 may be coupled to the system memory 50, in one embodiment. The interface 46 is also coupled to a bus 52. The bus 52 may be coupled to another interface 54, as well as an event storage 58, and a basic input/output system (BIOS) storage 10. The BIOS storage 10 may store the BIOS including the non-boot block 14 and the boot block 16. In one embodiment the storage 10 may be a flash memory.

Finally, in some embodiments, a baseboard management controller (BMC) 60 may also be coupled to the bus 52. The BMC 60 is a controller that may be responsible for facilitating automatic network connections with the platform 42. The BMC 60 is effectively a processor or controller used for system management purposes. For example, the BMC 60 may be utilized to wake up a platform 42 through a local area network. The interface 54 may be coupled to a hard disk drive 36 that, in turn, may be coupled to an EFI partition 12.

When a restart event is detected, the PAL_A_GENERIC firmware 18 receives the restart event and searches a firmware interface table (FIT) the storage 10 to locate a suitable onboard processor compatible with PAL_A_SPECIFIC 20. When this processor is found, the PAL_A_SPECIFIC component is authenticated and control is passed to the PAL_A_SPECIFIC component 20. The PAL_A_SPECIFIC component 20 immediately hands control over to an original equipment manufacturer system abstraction layer-A (SAL-A) component at SALE_ENTRY. SALE_ENTRY is a shared SAL-A entry point from code in PAL-A and PAL-B for reset, recovery, machine check and initialization. The SAL-A component may be prepared specifically by each original equipment manufacturer for its particular platform 42.

Figure 3:
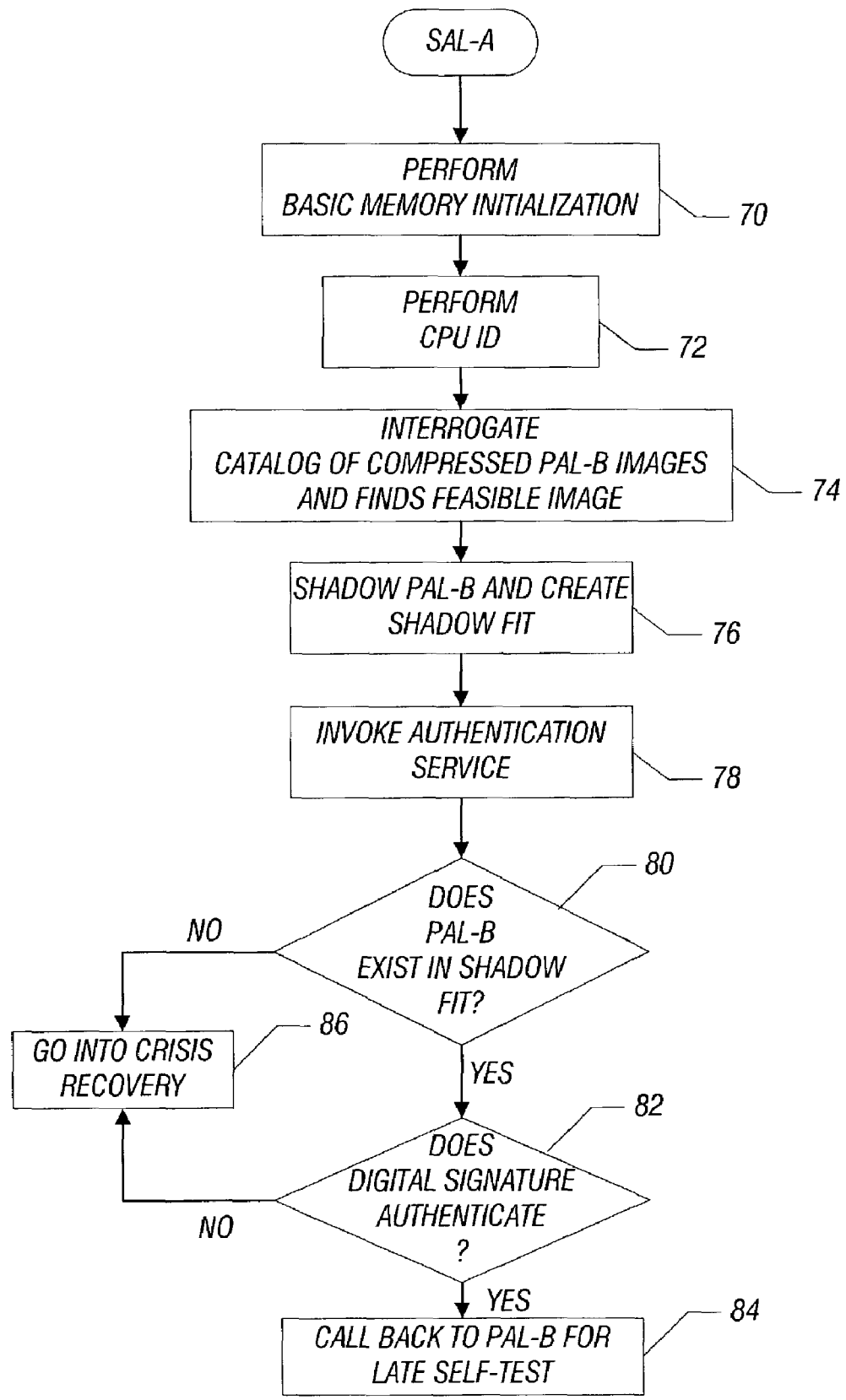
FIG. 3 is a flow chart for a system abstraction layer component in accordance with one embodiment of the present invention.

Referring to FIG. 3, the SAL-A code initially performs basic memory initialization, as indicated in block 34. Then the code performs a processor identification as indicated in block 36. The code interrogates the catalog 24 of compressed PAL-B images and locates a feasible image for the particular system as indicated in block 38. The PAL images may be stored in a directory on the storage 10 in one embodiment or may be stored in a file system partition 12, such as an EFI partition, on a disk in another embodiment also shown in FIG. 2. The processor identifier, determined in block 36, may be utilized to determine the most feasible image.

On successful discovery of a PAL-B image, the SAL-A code shadows the PAL-B and creates a shadow firmware interface table as indicated in block 40 in one embodiment. Shadowing is copying ROM-based code and data structures to random access memory, for example to increase performance and allow updates of ROM-based data structures by initialization firmware. In another embodiment, SAL-A may shadow PAL-B in memory and then may tell PAL-A where PAL-B is in memory (instead of using a shadow FIT).

The code then invokes an authentication service using the memory-based PAL-B image. If the PAL-B image is found in the shadow FIT as determined in diamond 34, a check at diamond 36 determines whether the digital signature authenticates. If so, the code calls back to the PAL-B for a late self-test as indicated in block 84. If either the signature does not authenticate or the PAL-B does not exist, the system goes into crisis recovery flow 86.

Thus, instead of immediate PAL-B challenge by PAL_A_SPECIFIC, a late authentication of PAL-B allows system code, which includes the SAL-A, to germinate more system states. This permits access to a set of compressed PAL-B images. The platform firmware then can create a memory-based FIT and shadow the PAL-B into memory. The platform firmware may then invoke the authentication service.

Since PAL_A_SPECIFIC performs a signature verification, an error or malicious shadowing of the PAL-B by platform firmware will be detected because the signature check will fail at diamond 82. As such, this late shadowing need not compromise security assertions. Also, since the PAL-B is needed for the late self-test, deferring the security check should not compromise the flow.

In some embodiments, the ability to have a plurality of available PAL-B components without requiring excessive flash capacity may be advantageous. Various PAL-B components may be compressed, stored and accessed as appropriate given the applicable processor type. The selection of the appropriate component may be done without user interaction in some embodiments. This ability to access a selectable PAL-B component without user intervention permits upgrading of platforms with newer processors and enables processor manufacturers to support various generations of processors simultaneously in some embodiments. This ability to support multiple generations may reduce the costs of service calls and bills of materials for a single processor model in that the PAL-B components can be compressed or stored on disk, allowing migration to a smaller system flash memory.

In some embodiments, an update to PAL-B may be implemented without a full BIOS rebuild. This avoids the need to have the user update the entire BIOS, not just the processor-specific PAL-B.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a processor;
    a storage coupled to said processor, said storage storing instructions that enable the selection of one of at least two selectable processor abstraction layer B components within one basic input/output system program.

2. The system of claim 1 wherein said storage also stores a basic input/output system.

3. The system of claim 1 wherein said storage is a hard disk drive.

4. The system of claim 1 wherein said storage stores a catalog of selectable processor abstraction layer components.

5. The system of claim 1 wherein said selectable processor abstraction layer components are part of a file system partition.

6. The system of claim 5 wherein said file system partition is an accessible firmware interface partition.

7. The system of claim 1 wherein said storage stores instructions that enable an authentication service to be invoked to authenticate a selected one of said processor abstraction layer components.

8. The system of claim 1 wherein said storage stores instructions to shadow a selected one of said at least two processor abstraction layer components.

9. The system of claim 1 wherein said storage stores instructions to shadow a firmware interface table stored in said storage.

\* \* \* \* \*